United States Patent [19]

Akasu

[11] Patent Number: 4,903,210
[45] Date of Patent: Feb. 20, 1990

[54] METHOD FOR REDUCING KNOCKING IN INTERNAL COMBUSTION ENGINE

[75] Inventor: Masahira Akasu, Hyogo, Japan

[73] Assignee: Mitsubishi Denki Kabushiki Kaisha, Tokyo, Japan

[21] Appl. No.: 788,678

[22] Filed: Oct. 18, 1985

[30] Foreign Application Priority Data

Apr. 22, 1983 [JP] Japan .................... 58-71718
Apr. 22, 1983 [JP] Japan .................... 58-71719
Apr. 22, 1983 [JP] Japan .................... 58-71720
May 16, 1983 [JP] Japan .................... 58-86820
Jun. 3, 1983 [JP] Japan .................... 58-99679

[51] Int. Cl.⁴ .................... F02P 5/14; F02P 5/04
[52] U.S. Cl. .................... 364/431.08; 123/425; 123/416; 123/435; 73/35
[58] Field of Search .................... 364/431.08; 123/425, 123/435, 416; 73/35

[56] References Cited

U.S. PATENT DOCUMENTS

| | | | |
|---|---|---|---|
| 4,242,995 | 1/1981 | Schramm et al. | 123/425 |
| 4,268,910 | 5/1981 | Omori et al. | 364/431.08 |
| 4,269,154 | 5/1981 | Iwata et al. | 123/425 |
| 4,328,779 | 5/1982 | Hattori et al. | 123/425 |
| 4,367,531 | 1/1983 | Furuhashi et al. | 364/431.08 |
| 4,471,736 | 9/1984 | Yoshida et al. | 123/425 |

FOREIGN PATENT DOCUMENTS 0022159 1/1981 European Pat. Off. ............ 123/425

Primary Examiner—Parshotam S. Lall
Attorney, Agent, or Firm—Sughrue, Mion, Zinn, MacPeak & Seas

[57] ABSTRACT

A method for reducing knocking in an internal combustion engine providing an improved response to changes of operating conditions of the engine and which is capable of producing precise knocking control under all combinations of operating conditions. The knocking level, load condition and rotational speed of the engine are detected. At addresses of a memory defined by the load and speed of the engine, values are stored which are calculated in accordance with the detected knocking levels, and ones of these values are read out in accordance with addresses corresponding to a present combination of a load condition and engine speed. At least one control parameter, such as the ignition timing, is corrected on the basis of the values read out from the memory and the detected knocking level. The values stored in the memory are changed at predetermined periods bidirectionally.

13 Claims, 5 Drawing Sheets

METHOD FOR REDUCING KNOCKING IN INTERNAL COMBUSTION ENGINE

BACKGROUND OF THE INVENTION

The present invention relates to a method for reducing knocking in an internal combustion engine in which knocking of the engine is detected to control at least one of a plurality of parameters determining the operational characteristics of the engine.

It has been known that the occurrence of knocking depends upon various factors determining the engine performance, such as the ignition timing, air-to-fuel ratio, intake air temperature, intake air humidity, combustion chamber temperature, etc. Among these, the ignition timing and the air-fuel ratio are relatively easily controllable with relatively low cost components and hence are frequently used to control knocking. Particularly, there have been known many anti-knocking devices using ignition timing control.

The conventional anti-knocking device using ignition timing control utilizes a feedback control system in which, when knocking occurs, the ignition timing is delayed from a predetermined reference angle by a constant angle or an angle corresponding to the degree of the knocking. When knocking ceases, the delay angle is reduced at a high rate, for instance, 0.5°/sec., so that the ignition timing is set near the knocking limit at all times.

In the above-mentioned ignition timing control system, it is necessary to set the reference ignition timing at a well-advanced angle. Therefore, the ignition timing at the commencement of knocking control frequently exceeds the knocking limit, causing a large amount of knocking to appear.

Further, since both small and large ignition timing correction ranges which require knocking restriction are controlled according to the detected knocking signal (feedback signal), a wide dynamic range of the system is necessary; otherwise it is very difficult to perform exact control over the entire operating range of the engine.

In addition to the defects of the conventional anti-knocking device mentioned above, when the operating condition of the engine varies, there is a considerable delay in the feedback signal to reflect such changes. That is, the response to variations of operating conditions is poor.

Other factors such as intake air temperature and intake air humidity, etc., which depend upon changes in environmental conditions, change very slowly. Therefore, the knocking conditions vary over only long periods. In other words, the degree of knocking which occurs in relatively short time periods for like operating conditions of the engine is the same and there is no difference in the frequency and intensity thereof between knocking occurrences. That is, the control amount required to restrict knocking for like operating conditions is substantially the same over short time periods. Therefore, the control value stored in a memory need not be changed over short periods. For the factors which change only slowly, it is possible to correct the control value gradually.

SUMMARY OF THE INVENTION

In view of the above, an object of the present invention is to provide a method for reducing knocking in an internal combustion engine which provides an improved response to changes of operating conditions of the engine over the entire operating range thereof and which is capable of producing precise knocking control under all combinations of operating conditions.

According to the present invention, the above and other objects are achieved by providing a method for reducing knocking comprising detecting the occurrence of knocking of an engine, producing in response to a result of the knocking detection a control signal, storing in memory means having plural memory regions each assigned to a different one of various operating conditions of the engine average control values for the respective operating conditions, and sequentially performing knocking control on the basis of the average control value stored at the time when knocking occurs and small correcting values according to the instantaneous intensity of knocking, whereby knocking control is precisely and quickly performed. Further, in accordance with the present invention, the stored average control values are changed in one direction when knocking occurs and in the opposite direction when knocking ceases.

BRIEF DESCRIPTION OF THE DRAWINGS

The anti-knocking method according to the present invention will be described in detail with reference to the accompanying drawings in which.

DESCRIPTION OF THE PREFERRED EMBODIMENTS

Figure 1:
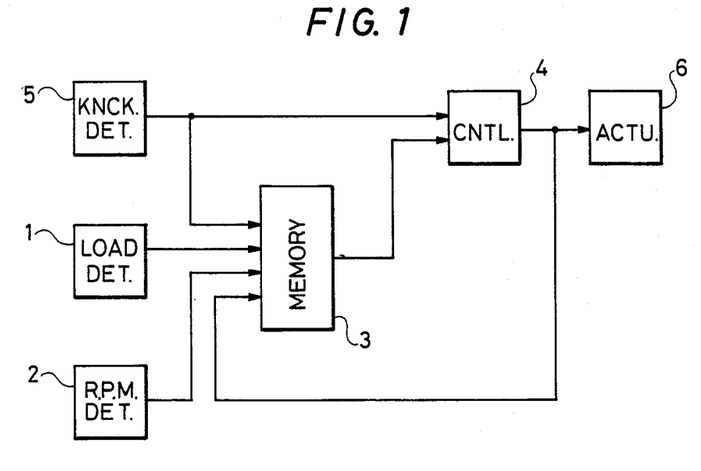
FIG. 1 is a block diagram of a preferred embodiment of an anti-knocking device for an internal combustion engine constructed according to the present invention.

In FIG. 1, a load detector 1 detects the load of the engine and a speed detector 2 detects the speed of rotation of the engine. Outputs of the detectors 1 and 2 are used to read out a corresponding knocking control value stored in one of the memory regions of a memory 3. The read-out control value is applied to a control operating device 4.

The control operating device 4 receives the control value from the memory device 3 and the knocking signal from the knocking detector 5 and from them calculates a knocking restriction control amount with which an actuator 6 is controlled. When the operating condition of the engine satisfies predetermined conditions, the memory device 3 functions to renew or change the stored control amount to an increased or decreased amount according to whether or not the knocking detector 5 detects knocking.

Figure 2:
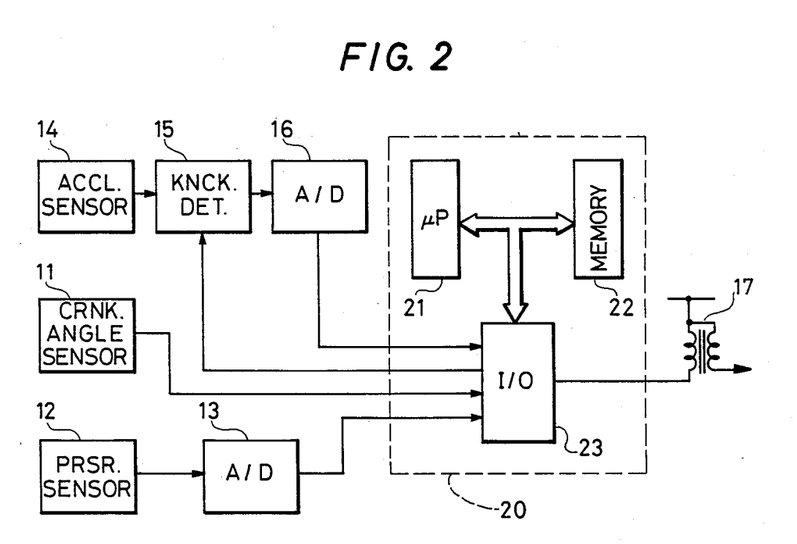
FIG. 2 is a block diagram showing the device of FIG. 1 in more detail.

FIG. 2 is a block diagram showing the device in FIG. 1 in more detail. Since various factors cause knocking to occur, the knocking may be reduced by controlling any of those factors. The ignition timing, which is one of those factors, is commonly used.

In FIG. 2, a crank angle sensor 11 responds to the crank position of the engine to produce a reference crank angle signal, and a pressure sensor 12 detects the intake air pressure of the engine to produce a pressure signal corresponding to the detected pressure. The pressure signal is fed to a first A/D converter 13 where it is digitized.

An acceleration sensor 14 detects the acceleration rate of the engine. The output of the acceleration sensor 14 is filtered by a knocking detector 15 to discriminate a knocking component produced by knocking of the engine. The knocking component signal detected by the knocking detector 15 is fed to a second A/D converter 16 where it is digitized.

The outputs of the first and second A/D converters 13 and 16 and the crank angle sensor 11 are fed to an interface 23 of a microcomputer 20, and an output from the interface 23 is fed to the knocking detector 15. The microcomputer 20 includes as primary components a microprocessor (CPU) 21, a memory device 22 and an input/output signal processing device, specifically, the interface 23. The output of the interface 23 is applied to an ignition coil 17.

In operation, the crank angle sensor 11, detecting the angle of rotation of the engine once in each ignition period, provides a pulse representing a crank reference angle, which is fed to the interface 23 of the microcomputer 20. The pressure sensor 12 detects the air pressure in the intake manifold of the engine and provides a pressure signal having a level corresponding to the pressure. Since the air pressure in the intake manifold changes according to the load condition of the engine, it is possible to determine the load condition of the engine from the level of the pressure signal. The pressure signal from the pressure sensor 12 is digitized by the first A/D converter 13 and supplied to the interface 23.

The acceleration sensor 14, mounted on the engine, detects vibration of the engine. The output of the acceleration sensor 14 includes a noise signal component due to a mechanical noise produced by the normal operation of the engine and a knocking component due to vibration produced by knocking. The knocking detector 15 functions to separate the knocking component from the output of the acceleration sensor 14 and to provide a knocking signal whose level depends on the intensity of knocking. The knocking signal is digitized by the second A/D converter 16 and supplied to the interface 23. The knocking detector 15 is reset by the interface 23 according to an instruction from the microprocessor 21 for detecting subsequent occurrences of knocking.

The memory device 22 of the microcomputer 20 includes a ROM and a RAM. The ROM has a region including a plurality of addresses, each assigned to a specific operating mode of the engine, i.e., a specific combination of engine speed and engine load condition. In these regions are stored reference ignition advance angles for the various operating modes of the engine. This region is termed herein an "advance map". The RAM has a region including a corresponding number of addresses, each assigned to a specific operating mode of the engine. In that region of the RAM are stored average control values calculated according to the output of the knocking detector 15 for the various operating modes of the engine. This region of the RAM is herein termed a "control value map".

The microcomputer 20 calculates a knocking control value according to the outputs of the crank angle sensor 11, the pressure sensor 12 and the acceleration sensor 14 to thereby set an optimum ignition timing with which the current supply to the ignition coil is controlled. The microcomputer 20 further functions to renew or change the average control value for knocking prevention when the engine operation satisfies, for example, the following conditions.

Condition 1: variation of engine speed $\leq$ 50 rpm.
Condition 2: load variation $\leq$ 5%
Condition 3: Conditions 1 and 2 are satisfied during 100 successive ignitions.

When sequential correction of the control value under these conditions, i.e., when the average control value is not sufficient for a desired amount of knocking reduction, a correction value is added sequentially to the average control value. When the correction value is zero, i.e., when no knocking is occurring, the average control value is reduced by a unit amount. The new control value is stored in the corresponding address in the control value map of the memory device.

Sequential knocking reduction control on the basis of the revised average control value is carried out for subsequent occurrences of knocking. That is, the average control value is varied in such a manner that the frequency of sequential correction is minimized, and hence so that the ignition timing of the engine is optimized.

When the engine operating condition changes and the average control value which corresponds to the operating condition changes, knocking control is performed on the basis of the average control value. That is, the control is started not on the basis of the preceding control value but on the current control value. Thus, the responsiveness of control attained with the invention is much improved over the prior art.

It should be noted that, in any transient state of engine operation outside the three conditions which are satisfied simultaneously, such as during times of acceleration or deceleration, the average control values stored in the control value map are not revised. Therefore, no correction to the control value generated during transient operating states of the engine is employed.

Figure 3:
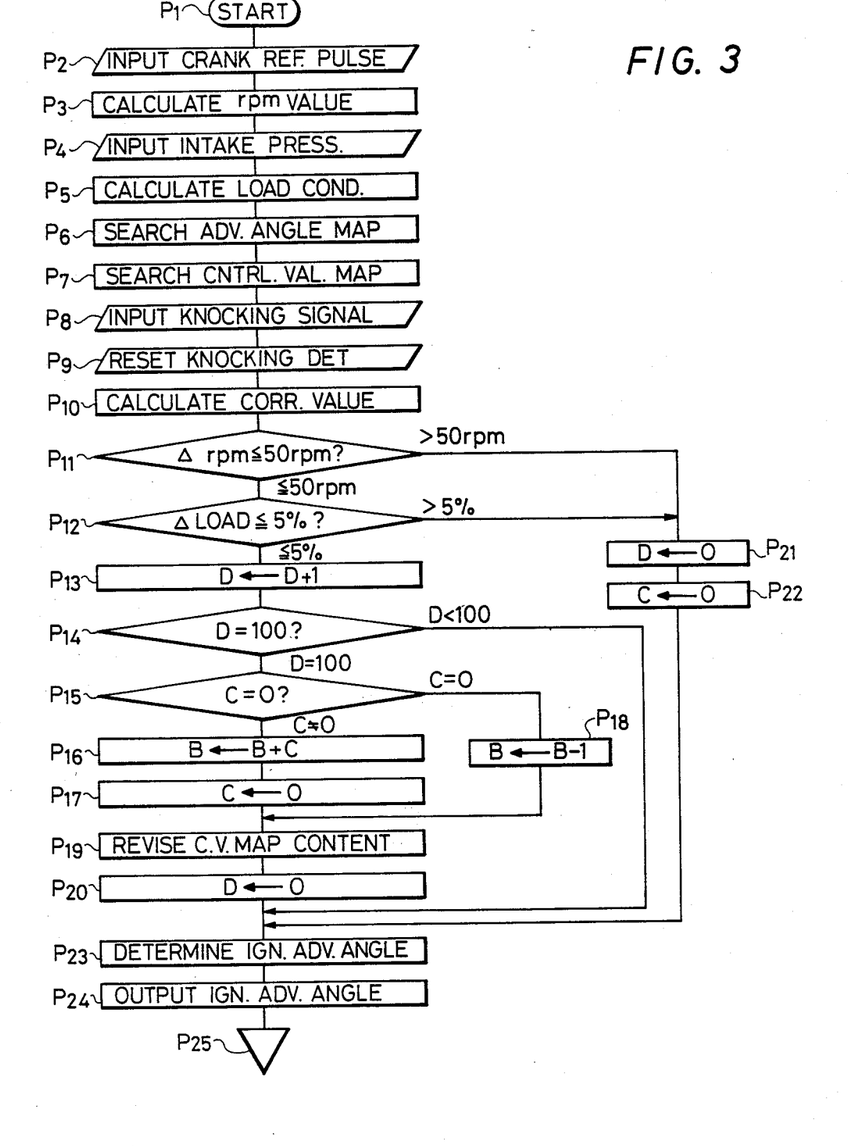
FIGS. 3 through 6 are flowcharts describing a control operations of the anti-knocking device of FIG. 1.

FIG. 3 is a flowchart showing the sequential control mentioned above in which $P_1$ to $P_{25}$ indicate respective steps of the control process.

In the flowchart shown in FIG. 3, the control operation is performed once in each ignition period, that is, when a crank reference angle pulse is sensed. The control sequence is started at step $P_1$. The crank reference angle pulse is supplied from the crank angle sensor 11 in step $P_2$, which is converted into an r.p.m. value in step $P_3$.

In step $P_4$, the pressure signal is supplied from the pressure sensor 12, from which the load condition of the engine is calculated in step $P_5$. In step $P_6$, the advance angle map is searched to determine the advance angle corresponding to the r.p.m. value obtained in step $P_3$ and the load condition obtained in step $P_5$. This value is stored in an A register.

In step $P_7$, the control value map is searched similarly to determine the average control value for knocking reduction corresponding to the r.p.m. value and the load condition obtained in steps $P_3$ and $P_5$. It is stored in a B resister.

A knocking signal is supplied from the knocking detector 15 in step $P_8$, and a signal for resetting the knocking detector 15 is produced in step $P_9$ to make it ready for a subsequent detection of knocking.

In step $P_{10}$, a control correction whose value corresponds to the intensity of the knocking signal obtained in step $P_8$ is calculated and added to a preceding correction stored in a C register. The sum of the two correction values is stored again in the C register. In step $P_{11}$, it is determined whether or not the variation of the r.p.m. value is smaller than 50 r.p.m. (condition 1), and in step $P_{12}$, it is determined whether or not the load variation is within 5% (condition 2). When either of these conditions is not satisfied, the content of a D register is made zero in step $P_{21}$ and the content of the register C, which is the preceding sequential correction value and which is now useless, is made zero in step $P_{22}$.

The D register is used for counting the number of ignition pulses, which number is used to determine whether or not condition 3 is satisfied. When conditions 1 and 2 are satisfied simultaneously, the value stored in the D register is incremented by 1 and the result is stored again in the D register in step $P_{13}$. Then, it is confirmed in step $P_{14}$ whether or not the content of the D register is 100. That is, it is confirmed whether or not condition 3 is satisfied. When the content of the D register is smaller than 100, the process shifts to step $P_{23}$.

When the content of the D register is equal to 100, that is, when all of conditions 1, 2 and 3 are satisfied, it is confirmed in step $P_{15}$ whether or not the sequential correction value stored in the C register is 1. When it is 0, the content of the B register, which stores temporarily the average control value obtained by the search performed in step $P_7$, is reduced by 1 and the result is stored again in the B register in step $P_{18}$.

When the content of the C register is not 0, the content of the C register, which is stored therein in step $P_{17}$ as the sequential correction value which is a sum of the contents of the B and C registers and stored in the B register in step $P_{16}$, is made 0.

In step $P_{19}$, the value revised in step $P_{16}$ and stored in the B register is stored at an address in the control value map, which corresponds to the current operating conditions, as a new average control value.

In step $P_{20}$, the D register is reset to 0 for a subsequent revision of the control value map.

In step $P_{23}$, the ignition advance angle is determined from the set advance angle obtained by searching the advance angle map in step $P_6$ and stored in the A register, the average control value stored in the B register (when steps $P_{15}$ through $P_{20}$ are employed, the revised average control value), and the sequential correction amount stored in the C register, and, in step $P_{24}$, the ignition advance angle is supplied to an output register. The process is repeated from step $P_{25}$.

At a time when the rotational angle of the engine reaches a value corresponding to the ignition advance angle specified to the output register, current flow to the ignition coil is abruptly cut off by the interface 23 to thus generate an ignition pulse.

If no knocking occurs while conditions 1 to 3 are satisfied, the average control value is reduced by one unit as shown by the steps subsequent to step $P_{18}$. Therefore, if the engine continues to operate under the same conditions, the average control value is reduced successively every 100 ignition periods, ultimately becoming a negative value. That is, the ignition timing is continuously advanced beyond the ignition advance angle stored in the advance angle map.

As mentioned previously, although in the conventional anti-knocking device knocking reduction is performed by controlling the retard angle, i.e., by control in one direction only, the control process according to the present invention is capable of performing either advance or retard control.

Accordingly, by storing in the advance angle map an advance angle which is an optimum for the engine and storing in the whole area of the control value map zero as the initial value, initial knocking restriction control is commenced with reference to the designated initial value and then it is corrected by the average control value for knocking condition changes due to seasonal variations and/or differences among individual engines. Therefore, there is no need of setting the control value by taking the control range of the knocking restriction into consideration, and hence the controllability in the initial stage is also improved remarkably.

Taking potential damage and/or efficient operation of the engine into account, it is desired to operate around the knocking limit. However, there is a strong probability of knocking even around the knocking limit. When such knocking is detected and the stored control value is revised thereby towards the knocking restriction side, the engine must be operated, subsequently, in a state below the knocking limit, causing a lowered engine output and a reduced fuel economy.

Figure 4:
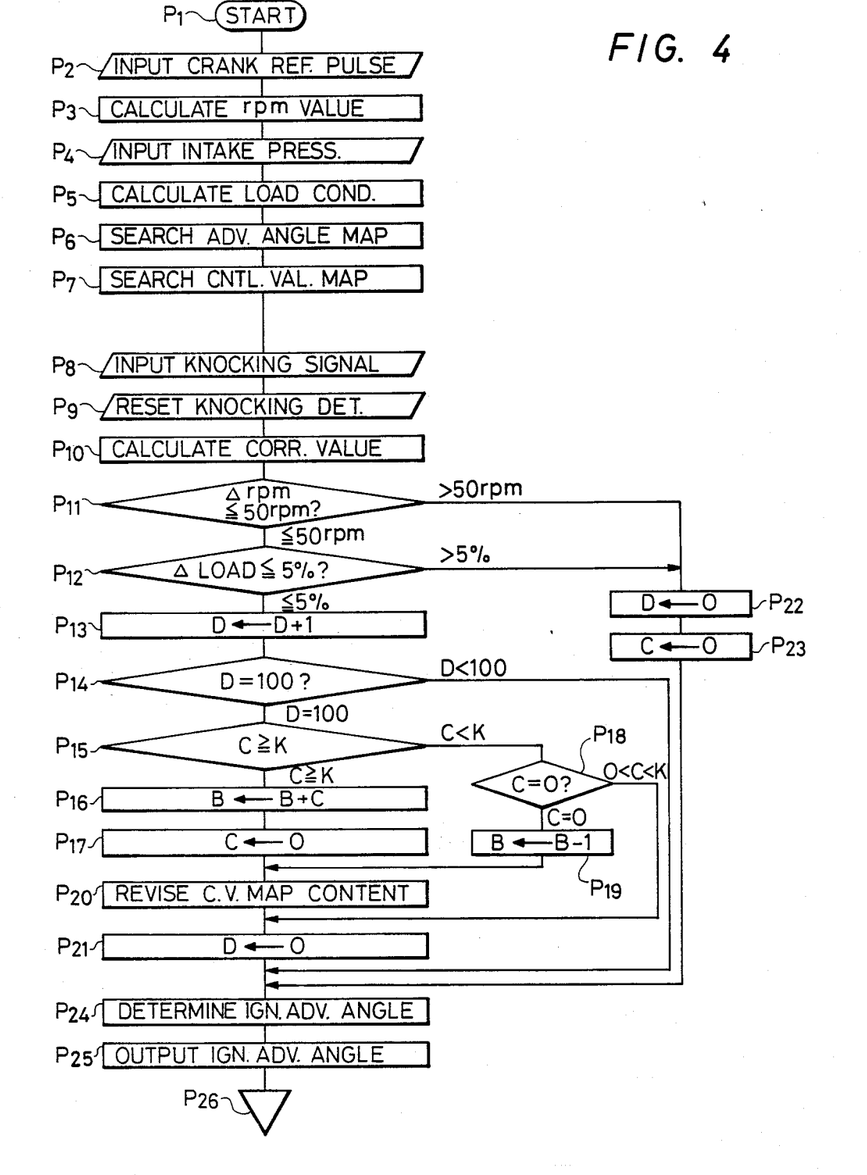

FIG. 4 is a flowchart showing a process for performing control which avoids such disadvantages. The flow chart of FIG. 4 differs from that shown of FIG. 3 in step $P_{15}$ and those subsequent thereto. In step $P_{15}$, the content of the D register, which is determined in step $P_{14}$ as being 100, is tested to determine whether or not the content of the C register is larger than a predetermined value K, and when it is larger than K, i.e., the average control value is smaller than a desired value, the content of the B register is added to the content of the C register reduced by K and the result is stored in the B register in step $P_{16}$. When the content of the C register is smaller than K, it is further determined, in step $P_{18}$, whether or not it is 0. When the content of the C register is between 0 and K, the average control value is not revised and the operation is skipped to step $P_{24}$.

When the content of the C register is 0, i.e., there is no knocking occurring, the content of the B register, which temporarily stores the average control value obtained by searching the control value map in step $P_7$, is reduced by a unit amount and the result is stored again in the B register in step $P_{19}$.

In step $P_{20}$, the content of the B register, which was revised in step $P_{16}$ or $P_{19}$, is stored in an area of the control value map corresponding to the current engine operating conditions as a new average control value. In step $P_{21}$, the D register is reset for a next revision of the control value map.

In step $P_{24}$, the ignition advance angle is determined on the basis of the preset advance angle, which is obtained by searching the advance angle map and stored in the A register in step $P_6$, the average control amount stored in the B register (when steps $P_{15}$ to $P_{21}$ are employed, a revised average control amount), and the sequential correction value stored in the C register, and, in step $P_5$, the ignition advance angle is supplied to the output register. Subsequently, in step $P_{26}$, the next control sequence is initiated.

When no knocking is produced for 100 ignition periods when conditions 1 and 2 are satisfied, the operations through step $P_{13}$ and those subsequent thereto are the same as those described with reference to FIG. 3.

The frequency of knocking around the knocking limit is very small. It is possible to revise the stored control value within a very short time to eliminate such small knocking. However, when there is no knocking within such a short time, the stored control value is revised downwardly, and thus the subsequent control must be started on the basis of the reduced control value, causing a single large knock or a series of knocks to occur. Therefore, it is necessary to revise the control value again, causing a variation of the checking control value and hence a variation of the ignition timing to occur. On the other hand, if the revision of the stored control value is performed over a longer period of time so that it is possible to confirm the knocking limit, when, for example, the stored control value is not sufficient, and the operating mode of the engine can shift before the revision is performed. Therefore, when the initial engine operating mode is recovered, a large amount of knocking can occur. That is, sequential correction of the control amount is performed to reduce such large knocking, and thus the revision of the stored control value can be performed only after the long revision period.

Figure 5:
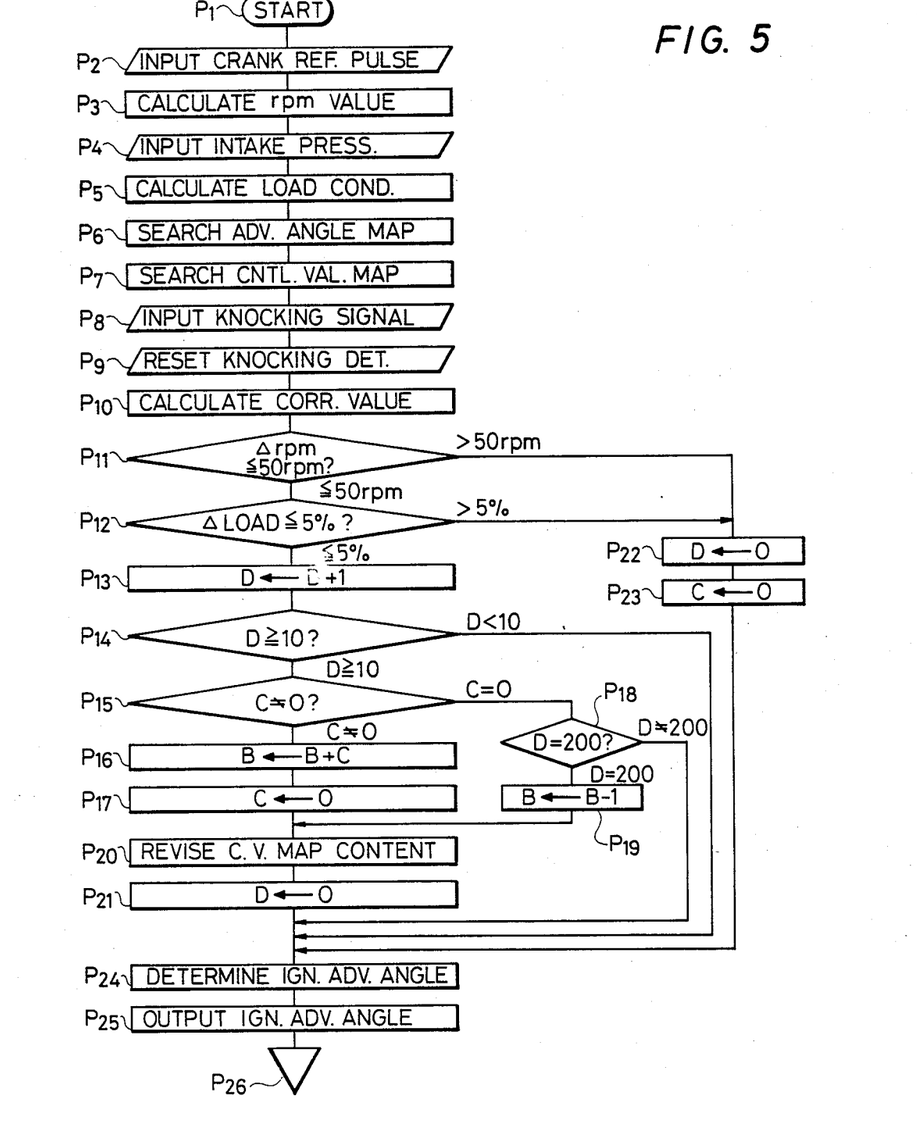

FIG. 5 is a flowchart showing a method for correctly performing the revision of the stored control value in such a case. In this case, when the engine is operated with conditions 1 and 2 satisfied for a time period corresponding to 10 successive ignition periods while sequential correction for knocking reduction is performed for knocking occurring due to a lack of an average control value, the sequential correction is added to the average control value and the result is stored in a corresponding area of the control value map. On the other hand, when the engine is operating with conditions 1 and 2 satisfied for a time period corresponding to 200 ignition periods in which there is no knocking and no sequential correction performed, the current knocking reduction condition is assumed as being below the knocking limit and the average control value is reduced by a unit control amount. The result is stored in a corresponding area of the control value map. By revising (reducing) the average control value only when there is no knocking for a relatively long time period, the revision of the average control value towards knocking production in a range beyond the knocking limit is prevented, thereby preventing variation of the knocking reduction control value.

In FIG. 5, the operations through steps $P_1$ to $P_{13}$ are the same as that in any of the flowcharts in FIGS. 3 and 4. In step $P_{14}$, it is determined whether or not the content of the P register is 10. That is, it is determined whether or not the operation of the engine has continued for 10 ignition periods with conditions 1 and 2 satisfied. When the content of the D register is smaller than 10, the operation is shifted to step 24, and when it is 10 or more, it is determined in step $P_{15}$ whether or not the sequential correction amount stored in the C register is 0.

When the content of the C register is not 0, i.e., when knocking has occurred, the C register content is added to the content of the B register and the result is stored in the B register to make the content of the C register 0 in step $P_{16}$. When C=0, i.e., there is no knocking, it is determined in step $P_{18}$ whether or not the content of the D register is 200. That is, it is determined whether or not the engine has continued to operate under conditions 1 and 2 without knocking for a time period corresponding to 200 ignition periods. When the operating time is shorter than 200 ignition periods, the operation is shifted to step $P_{24}$. When it is 200 ignition periods or more, the content of the B register, which temporarily stores the average control value obtained by searching the control value map in step $P_7$, is reduced by a unit amount and the result is stored in the B register again in step $P_{19}$. Then, in step $P_{20}$, the content of the B register, which is revised in step $P_{16}$ or $P_{19}$, is stored in an area as a new average control value. In step $P_{21}$, the D register is reset to 0 to prepare for the next revision of the control value map. In step $P_{24}$, an ignition advance angle is determined on the basis of the preset advance angle obtained by searching the advance angle map and is stored in the A register in step $P_6$, the average control value stored in the B register (when steps $P_{15}$ to $P_{21}$ are employed, the revised average control value) and the sequential correction value stored in the C register and, in the step $P_{25}$, the ignition advance angle is supplied to the output register. Then, in step $P_{26}$, a next control sequence is initiated.

In the case where the engine continues to operate under conditions 1 and 2 while there is no knocking for 200 ignition periods, the average control value is reduced by a unit amount as shown in the steps subsequent to step $P_{13}$. Therefore, when the engine further operates in such a mode, the average control value is reduced every 200 ignition periods, ultimately becoming negative. That is, the ignition is performed using a more advanced angle than the present ignition advance angle stored in the advance angle map.

The reference ignition timing should be set at an angle slightly advanced from the knocking limit. However, it is practically impossible to do so when various factors causing knocking are taken into consideration. When the angle difference in the advanced direction between the reference and the actual setting is large, a series of large knocks may occur, and when the difference in the retarded direction is large, the engine output and the fuel economy are insufficient.

Figure 6:
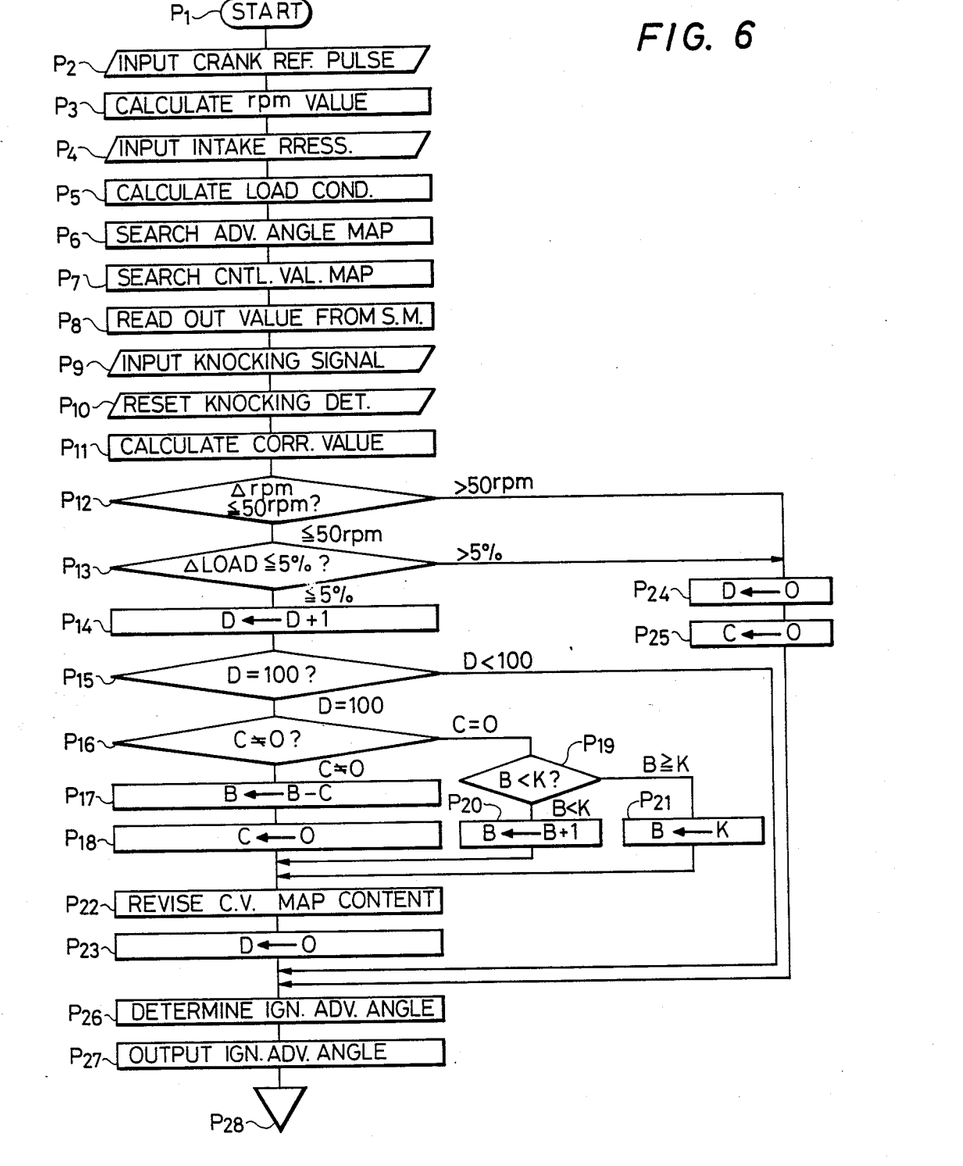

FIG. 6 shows a flowchart for a process which is effective to eliminate the above-mentioned problems. In FIG. 6, when the engine operates continuously for a period corresponding to 100 ignition periods while conditions 1 and 2 are satisfied while sequential correction is performed to reduce knocking occurring in that period, i.e., when revision of the average advance angle correction on the retarded side is necessary, the average advance angle correction value is reduced in an area of the control value map corresponding to the given operating conditions as a new average advance angle correction value. On the other hand, when no knocking occurs in the 100 ignition periods and the sequential correction amount is 0, the ignition timing due to the current knocking reduction control is more advanced than the knocking limit. Therefore, the average advance correction value is increased by a unit control amount. Then, the increased correction value is compared with an advance correction upper limit stored in a corresponding address of the control value map. If the increased correction value is equal to or larger than the upper limit value, it is recognized that the increased correction reaches the upper limit and the advance correction upper limit value read out from the control value map is made a new average advance angle correction value. On the other hand, when the increased amount is smaller than the upper limit, the increased value is made a new average advance angle correction value. The average advance angle correction value thus obtained is stored in an area of the control value map corresponding to the current engine operating conditions.

Thereafter, sequential control for knock reduction is performed on the basis of the average advance angle correction value thus revised. That is, the average advance angle correction value is sequentially revised so that the sequential correction value becomes a minimum, thereby setting the ignition timing at the knocking limit. The average advance angle correction can be performed on both advanced and retarded angle sides from the reference ignition advance angle.

There is an upper limit of the advance angle correction in the advance angle side which is set by the control value map. When the knocking limit is in a more advanced region than the MBT (minimum advance for best torque) value for given engine operating conditions, the average advance angle correction value is used to control the ignition timing at the knocking limit by storing, in the control value map, a control value corresponding to a difference between the MBT value and the reference ignition advance angle stored in the advance angle map. In the region in which the knocking limit exceeds the MBT value where there is no need of knocking control, the average advance angle correction value is limited by the control value map, and the ignition timing is set at the MBT value. That is, ignition at an advance angle exceeding the MBT value is prevented. Therefore, ignition at the optimum ignition timing is realized over the entire range of engine operating conditions.

When the engine operating conditions change, knocking control is started with sequential correction on the basis of the average advance angle correction value stored in the corresponding area of the control value map. That is, control commences immediately using the average control value so obtained, resulting in an improved response. For the transient state of engine operations, there is no revision of the stored average advance angle correction value.

In FIG. 6, steps $P_1$ to $P_7$ are the same as those described with reference to any of the preceding flowcharts. In step $P_8$, a value stored at a corresponding address in the control value map corresponding to the current engine operating conditions is read out, and the reference ignition advance angle, the average advance angle correction value, and the advance angle correction upper limit are stored in the A, B and K registers, respectively. In step $P_9$, a knocking signal is inputted, and in step $P_{10}$, a signal for resetting the knocking detector 15 is produced for subsequent detection of knocking. In step $P_{11}$, a control correction value corresponding to the intensity of the knocking signal is calculated and added to the preceding sequential correction value stored in the C register. The result is stored in the latter register. Then, in steps $P_{12}$ and $P_{13}$, conditions 1 and 2 are tested. If either of conditions 1 and 2 is not satisfied, the value of the D register is set to 0 in step $P_{24}$ and the sequential correction value C before the change of the engine operation is made zero in step $P_{25}$. Then, the operation is shifted to step $P_{26}$. The D register is used for counting the number of ignition pulses to determine the revision period of the average advance angle correction value. When both of the conditions are satisfied, the value stored in the D register in step $P_{14}$ is increased by 1 and the result is put back into the D register. In step $P_{15}$, it is checked whether or not the content of the D register corresponds to 100 ignition periods or more while conditions 1 and 2 are satisfied.

When the content is smaller than 100 ignition periods, the operation is shifted to step $P_{26}$. When the content is 100 or more, it is checked whether or not the sequential correction value stored in the C register in step $P_{16}$ is 0. If $C \neq 0$, i.e., knocking is occurring, the content of the B register is reduced by the content of the C register in step $P_{17}$ and the content of the C register storing the sequential correction value is set to 0 in step $P_{18}$. On the other hand, if $C=0$, i.e., there is no knocking, the content of the B register is compared with the advance angle correction upper limit stored in the K register in step $P_{19}$. When the content of the B register is smaller than that of the K register (which means that the average advance angle correction value is less than the advance angle correction upper limit), the content of the B register is increased by 1 and the result is stored again in the B register in step $P_{20}$. When $B \geq K$, the content of the K register is stored in the B register in step $P_{21}$. Thus, the content of the B register, which is the average advance angle correction value, is fixed to the advance angle correction upper limit. In step $P_{22}$, the content of the B register as revised in steps $P_{17}$, $P_{20}$ and $P_{21}$ is stored at a corresponding address in the control value map corresponding to the current engine operating conditions. In step $P_{23}$, the D register is reset to 0 for the subsequent use thereof. Then, in step $P_{26}$, the ignition advance angle is determined according to the reference ignition advance angle obtained from the advance angle map and stored in the A register in step $P_6$, the average advance angle correction value stored in the B register (when steps $P_{14}$ to $P_{23}$ are employed, the revised average advance angle correction value), and the sequential correction amount stored in the C register. In step $P_{27}$, the ignition advance angle is supplied to the output register. Then, in step $P_{28}$, a next control operation is initiated. When the engine rotational angle reaches a position corresponding to the ignition advance angle supplied to the output register, the interface 23 abruptly shuts off the current supply to the ignition coil to produce an ignition pulse.

According to the invention, contrary to the conventional knocking reduction method where only the retard angle is controlled, control is performed on both advanced and retarded sides with reference to the present advance angle. Therefore, by storing in the advance angle map the optimum ignition advance angle as the reference advance angle and storing in all of the areas of the control value map 0 as the initial value of the average advance angle correction value, initial knocking control is performed on the basis of the engine design value and knocking due to variations of the engine and/or seasonally varying factors is corrected by the average advance angle correction value. Thus, there is no need of presetting the correction value, and the controllability in the initial stage is considerably improved.

I claim:
1. An anti-knocking control method for an internal combustion engine, comprising the steps of:
   detecting knocking of the engine;
   detecting a load condition of the engine;
   detecting an engine rotational speed;
   storing, at addresses of memory means corresponding to predetermined engine operating modes each defined by a load condition and speed of the engine, reference values calculated in accordance with detected knocking levels for operating modes of the engine corresponding to said addresses;
   reading out one of said reference values, stored at on of said addresses corresponding to a combination of a detected load condition and engine speed;
   calculating a correcting control value of at least one control parameter of the engine on the basis of said one read-out reference value and said detected knocking level to control knocking of the engine;

determining whether a plurality of preconditions have been satisfied for a predetermined period of a number of ignitions of the engine;

changing, after said predetermined period of the preconditions are satisfied, said control value to a new value in a knocking restricting direction when knocking is present and in an opposite direction when no knocking is present; and storing, at addresses of said memory means corresponding to said predetermined operating modes, said new control value.

2. The method as claimed in claim 1, wherein variation of said stored reference value is bidirectional from zero.

3. The method as claimed in claim 1, wherein said memory means comprises a ROM and a RAM, said ROM having addresses corresponding to respective engine operation modes, said ROM storing said reference values for corresponding operating modes, and said RAM storing said average control values calculated in response to detected knocking levels for respective engine operating modes.

4. The method as claimed in claim 3, wherein said memory means comprises an A register for storing values corresponding to said engine operating modes read out from said ROM, a B register for storing average control values corresponding to said engine operating modes read out from said RAM, a C register for storing control correction values corresponding to an intensity of said knocking, and a D register for counting ignition pulses.

5. The method as claimed in claim 4, further comprising, when no knocking has occurred for a predetermined period and the average control value stored in said B register is larger than a predetermined value, storing the predetermined value in said register, and when it is smaller than the predetermined value, reducing the content of said B register by a unit amount.

6. The method as claimed in claim 4, wherein advance angles corresponding to said engine operating modes read out from an advance angle map in said ROM are stored in said A register, average control values for knocking reduction corresponding to said engine operating modes and read out from a control value map of said RAM are stored in said B register, control correction values for sequential correction corresponding to the intensity of knocking are stored in said C register, and counted numbers of ignition pulses are stored in said D register.

7. The method as claimed in claim 4, further comprising, when the value of said D register becomes a predetermined value, determining whether or not a sequential correction amount stored in said C register is zero, and when the sequential correction amount stored in said C register is zero, reducing the content of said B register by a unit amount and storing a resulting value in said B register, and when not zero, adding the content of said B register to the content of said C register and storing a resulting value in said B register, whereby the content of said B register is revised when the value of said D register reaches the predetermined value.

8. The method as claimed in claim 1, further comprising, when knocking of the engine is present and the value calculated on said knocking level exceeds a predetermined value, revising the value stored in said memory means in a direction in which the knocking is reduced.

9. The method as claimed in claim 1, further comprising, revising the value stored in said memory means in a direction in which knocking is reduced in a first period and in the opposite direction in a second period different from said first period.

10. The method as claimed in claim 9, wherein said first period is shorter than said second period.

11. The method as claimed in claim 1, further comprising calculating variations of the engine rotational speed and the engine load in a predetermined period on the basis of a detected engine speed and load, and revising the value stored in said memory means only when a calculated variation is within a predetermined range.

12. The method as claimed in claim 1, wherein the range of revision of values stored in said memory means is predetermined.

13. The method as claimed in claim 1, wherein said at least one control parameter comprises ignition timing of the engine.

* * * * *